(12) United States Patent
Choi et al.

(10) Patent No.: US 12,139,294 B2
(45) Date of Patent: Nov. 12, 2024

(54) PACKAGING APPARATUS FOR PACKAGING BAGS EQUIPPED WITH LABEL PRINTER

(71) Applicant: DH Co., Ltd., Gunpo-si (KR)

(72) Inventors: Yong Ahm Choi, Seoul (KR); Noh Wan Park, Suwon-Si (KR)

(73) Assignee: DH CO., LTD., Gunpo-si (KR)

( * ) Notice: Subject to any disclaimer, the term of this patent is extended or adjusted under 35 U.S.C. 154(b) by 0 days.

(21) Appl. No.: 18/289,124

(22) PCT Filed: Apr. 7, 2022

(86) PCT No.: PCT/KR2022/005023
§ 371 (c)(1),
(2) Date: Nov. 1, 2023

(87) PCT Pub. No.: WO2022/239971
PCT Pub. Date: Nov. 17, 2022

(65) Prior Publication Data
US 2024/0217691 A1 Jul. 4, 2024

(30) Foreign Application Priority Data

May 14, 2021 (KR) .......................... 10-2021-0062538

(51) Int. Cl.
*B65B 5/04* (2006.01)
*B65B 41/16* (2006.01)
*B65B 43/12* (2006.01)
*B65B 43/26* (2006.01)
*B65B 43/36* (2006.01)
(Continued)

(52) U.S. Cl.
CPC ................ *B65C 9/46* (2013.01); *B65B 5/045* (2013.01); *B65B 41/16* (2013.01); *B65B 43/12* (2013.01);
(Continued)

(58) Field of Classification Search
USPC ....................................................... 53/131.4
See application file for complete search history.

(56) References Cited

U.S. PATENT DOCUMENTS 4,172,349 A * 10/1979 Lipes ...................... B65B 43/28
53/385.1
5,442,898 A * 8/1995 Gabree .................. B65B 43/36
53/385.1
(Continued)

FOREIGN PATENT DOCUMENTS

KR 10-2000-0060847 A 10/2000
KR 10-2018-0002701 A 1/2018
(Continued)

OTHER PUBLICATIONS

International Search Report of PCT/KR2022/005023 Mailed On Jul. 8, 2022.
(Continued)

*Primary Examiner* — Chinyere J Rushing-Tucker
(74) *Attorney, Agent, or Firm* — Rivka Friedman (57) ABSTRACT

The present disclosure a packaging apparatus for packaging bags equipped with a label printer, the packaging apparatus having a remarkably high packaging speed in comparison to packaging apparatuses of the related art.
The packaging apparatus of the present disclosure includes a frame equipped with components for operating and controlling the apparatus therein, a bag feeding unit automatically conveying and feeding half-cut and wound bags, a label attaching unit installed on the frame and printing and attaching a label to the bags that are conveyed, and an opening and sealing unit opening tops of the bags, putting a product into the bags, and then packing the bags through sealing.

5 Claims, 6 Drawing Sheets

(51) Int. Cl.
*B65B 51/14* (2006.01)
*B65B 61/28* (2006.01)
*B65C 9/46* (2006.01)

(52) U.S. Cl.
CPC ............ *B65B 43/267* (2013.01); *B65B 43/36* (2013.01); *B65B 51/146* (2013.01); *B65B 61/28* (2013.01)

(56) References Cited

U.S. PATENT DOCUMENTS

| | | | |
|---|---|---|---|
| 6,742,317 B2 | 6/2004 | Cronauer et al. | |
| 2003/0106285 A1* | 6/2003 | Cronauer | B65B 41/16 53/411 |
| 2009/0064637 A1* | 3/2009 | Riccardi | B65B 43/267 53/371.6 |
| 2020/0115082 A1* | 4/2020 | Hess | B65B 43/267 |

FOREIGN PATENT DOCUMENTS

| | | |
|---|---|---|
| KR | 10-2018-0101526 A | 9/2018 |
| KR | 10-2097364 B1 | 4/2020 |
| KR | 10-2133231 B1 | 7/2020 |

OTHER PUBLICATIONS

Automated Packaging Systems, LLC, (Sep. 25, 2017) Autobag® 550™ Bagging System [Video]. YouTube. https://www.youtube.com/watch?v=TB_aqTrGqL4.

* cited by examiner

PACKAGING APPARATUS FOR PACKAGING BAGS EQUIPPED WITH LABEL PRINTER

TECHNICAL FIELD

The present disclosure relates to a packaging apparatus for packaging bags and, more specifically, a packaging apparatus for packaging bags equipped with a label printer, the packaging apparatus having a simple and compact structure, simultaneously performing label printing and product packaging by being equipped with the label printer, and having a remarkably high packaging speed in comparison to packaging apparatuses of the related art.

BACKGROUND ART

Recently, purchasing products through the internet has been activated and, particularly, products having a small volume and not packaged in boxes among products ordered in this way are generally enclosed and packaged in bags, which are made of vinyl materials such as low-density polyethylene in a pouch type, and then delivered. In general product packing, a bag formed in a pouch type has the bottom sealed and the top half cut, so when it is automatically fed, the top of the bag is opened, a product is put into the bag, the top is sealed, and the top of the sealing portion is cut, whereby product packing is finished.

As a technology of packaging apparatus for packaging products, for example, there is a Korean Patent Application Publication No. 2006-24762, titled "VACUUM PACKAGING MACHINE AND LOADING SYSTEM", which relates to a technology for effectively packaging products in a vacuum state in an automated line. However, it has a limitation in that it is used only for products that are packaged in a vacuum state.

A "SEAL FLATTENER" of Korean Patent Application Publication No. 2018-101526 and a "PACKAGING MACHINE" of Korean Patent Application Publication No. 2018-2701 include an indexing unit that automatically moves bags connected to each other, an opening unit that opens conveyed bags, a pair of closing units that closes the openings of bags, and a sealing unit that seals the openings of bags, in which the closing units each include a first link that can rotate on a base member, a second link that can rotate on the first link, a sliding pivot member that is installed rotatably with respect to the base member, and fingers connected to the second link. However, these patents have the following problems.

First, since these patents are configured to supply air, which is supplied from an air compressor, through three nozzles to open the top of a bag and have to keep supplying air until four corners of the open bag are gripped, a lot of air is required and accordingly the compressor has to have large capacity. Since there is a problem that a large-capacity compressor cannot be installed inside the packaging machine, the volume occupied by the packing machine has to be increased.

Second, the structure is very complicated because it grips four corners of a bag with four grippers in order to open the bag and open the bag by operating the grippers through an actuator, has to keep gripping the top of the bag with the four grippers to maintain the open shape with the top open until a product is put in to the bag, and requires an actuator and an operating unit for operating the four grippers, so there is a problem that it takes too much time to open the top of a bag, put a product into the bag, and then pack the bag.

Third, it is required to repeat the operation of opening a bag while rotating each of the first link, the second link, and the fingers and then return them to the initial positions by rotating them back in the opposite direction in every packing, so the configuration and operation of the opening unit are very complicated, whereby there is a problem that it takes to very long time to pack a bag and accordingly the packing speed of very low.

Fourth, when a bag wound on a winding roll is automatically fed while being unwound at a predetermined speed, there is no means that can solve this problem and maintain a predetermined level of tension if tension in the bag temporarily changes and becomes loosened, so there is a problem that poor packaging may be generated.

Fifth, since the sealing unit for sealing after a product is put into a bag has a heating element and a seal backing bar, but the position of the heating element is fixed and bags made of a vinyl material are moved adjacent to the heating element, heat generated by the heating element that keeps being heated is applied also to parts other than the sealing portion of the bag. Accordingly, there is a problem that parts not related to the sealing portion of a bag are deformed by the heat and a portion of the bag is wrinkled while the bag stays to receive a product, making the sealing line of the sealing portion crumpled and twisted rather than being straight.

Sixth, a label printed with a delivery address, product information, etc. is required to be attached on the outer surface of a bag. Since the packaging machine is not equipped with a label printer, it is required to separately print a label and attach the label on a bag before the bag is fed to the packaging apparatus, and then feed the bag attached with the label to packaging machine. Therefore, label printing, label attaching, and product packaging has to be performed through a separate machine, so there is a problem that manpower and equipment are unnecessarily used and a lot of time is also used.

SUMMARY OF INVENTION

Technical Problem

The present disclosure has been made in an effort to solve the problems described above, and an objective of the present disclosure is to provide a packaging apparatus for packaging bags equipped with a label printer, the packaging apparatus having a simple and compact structure and having a remarkably high packaging speed in comparison to packaging apparatuses of the related art because the configuration for opening the top of a bag and the structure gripping a bag when forming a sealing portion after a product is put in the bag are improved and a compressor is disposed inside the apparatus.

Another objective of the present disclosure is to provide a packaging apparatus for packaging bags equipped with a label printer, the packaging apparatus being provided with a dancer roller to maintain tension of a bag that is conveyed at a predetermined level even though the tension of the bag temporarily changes, and being able to increase reliability in controlling and operating the apparatus and packaging by preventing a malfunction of a PC due to operation of a compressor.

Another objective of the present disclosure is to provide a packaging apparatus for packaging bags equipped with a label printer, the packaging apparatus being able to quickly and accurately package a bag without a separate process of attaching a label by directly printing a label through the label printer installed in the packaging apparatus while recognizing a bar code or a QR code storing the information of a product and by attaching the label onto a bag that is being fed and conveyed.

Solution to Problem

According to the packaging apparatus for packaging bags of the present disclosure, a configuration that opens the top of bags and a structure that seals and separates bags while gripping the bags after a product is put into the bag are improved; tension of bags that are conveyed is always maintained at a predetermined level by a dancer roller; a malfunction of a PC due to noise and a magnetic field, which are generated when a compressor is operated, is prevented by arranging positions of the compressor and the PC; and label printing and attaching and packaging are simultaneously performed by installing a label printer, thereby the packaging apparatus is made compact, and the packaging speed and reliability in packaging are remarkably improved.

Advantageous Effects of Invention

Since the packaging apparatus according to the present disclosure employs a structure that only temporarily supplies high-pressure air, which is supplied from a compressor, to one nozzle, there is no need for a lot of air, so the capacity of the compressor can be small, whereby the compressor is installed inside the apparatus, and accordingly, the structure of the packaging apparatus simple and compact. Further, since after a product is put into a bag, a pair of rotary cylinders rotates grippers to grip both ends of the bag and straightly flatten the bag, and in this state, sealing and separating a finished pack are almost simultaneously performed, packaging is performed remarkably quickly and accurately in comparison to packaging apparatuses of the related art.

Further, since a dancer roller is installed, tension adjustment bars regulate tension of the bags that are conveyed at a predetermined level while moving up and down even when the tension is temporarily changed, the shape of bags and accuracy in conveyance are maintained, thereby being able to remarkably improve reliability in packaging. Further, since an electric part box is disposed between a compressor and a PC installed inside the apparatus, a malfunction of the PC due to influence of a magnetic field and noise that are generated when the compressor is operated is prevented, thereby being able to increase reliability in controlling and operating the apparatus and in packaging.

In addition, by recognizing a barcode or a QR code storing the information of a product and directly printing and attaching a label to a predetermined part on the outer surface of a bag, which is automatically conveyed, through the label printer installed on the packaging apparatus, packaging is quickly and accurately performed without a separate process of attaching a label.

DESCRIPTION OF EMBODIMENTS

A packaging apparatus for packing bags equipped with a label printer according to the present disclosure includes: a frame equipped with components for operating and controlling the apparatus therein; a bag feeding unit automatically conveying and feeding half-cut and wound bags; a label attaching unit installed on the frame and printing and attaching a label to the bags that are conveyed; and an opening and sealing unit opening tops of the bags, putting a product into the bags, and then packing the bags through sealing.

Preferably, a PC controlling operation of the apparatus, an electric part box keeping various electric parts for operating the apparatus, and a compressor supplying air for opening tops of bags are installed inside the frame, and the PC and the compressor are spaced apart from each other such that the electric part box is disposed between the PC and the compressor.

Preferably, the bag feeding unit includes: a roll mount on which a winding roll having half-cut bags wound thereon is mounted; a dancer roller conveying bags, which are supplied and conveyed from the roll mount, to the label attaching unit while maintaining tension of the bags; first and second guide bars guiding bags that are conveyed from the dancer roller and positioned behind and in front of the label attaching unit, respectively; a third guide bar installed vertically over the second guide bar and guiding conveyance of bags; and pulling rollers pulling bags that are conveyed from the third guide bar.

Preferably, the dancer roller includes: a pair of tension adjustment plates each formed in a shape in which two coaxial circles are disposed to make an arc, a slot is formed between circumferential surfaces of the two coaxial circles, and a radius portion at a lower portion of the arc is open, and disposed respectively inside both side plates of the frame; a rotary bar installed such that both ends are connected to the side plates of the frame, respectively, through centers of the arcs made by the tension adjustment plates, and enabling rotation of the tension adjustment plates; rotation guide bars being three bars of which both ends are connected to inner sides of the side plates of the frame, respectively, and installed to be positioned inside and outside the circumferential surfaces of the coaxial circles and in the slot formed between the two coaxial circles; and tension adjustment bars being two bars connected to ends of the coaxial circles formed at lower portions of the arcs and being open at the radius portions, and connecting the pair of tension adjustment plates, in which when the tension adjustment plates are rotated about the rotary bar, the tension adjustment bars maintaintension of a bag that is conveyed while rotating with the tension adjustment plates.

Preferably, the opening and sealing unit includes: a nozzle opening a top of a bag that is conveyed by instantaneously blowing air, which is supplied from the compressor, to a width-directional center portion of the bag; a pair of blowers installed at both sides of the nozzle and blowing air into the bag with the top open by the nozzle; and a sealing mean sealing the top of the bag after a product is put into the bag through the open top.

Preferably, the sealing mean includes: a heating bar installed to be positioned in a portion where a slit, which is formed in a left-right direction on a front plate vertically installed on a front of the frame, is formed, and keptheated at a predetermined temperature for sealing; a supporting bar formed in a U-shape, installed in front of the heating bar, operated to move forward and backward, and pressing a top of a bag with a product therein into close contact with a portion right over the slit formed in the front plate of the frame; a pair of rotary cylinders installed on the front plate of the frame and having grippers bentin an L-shape at front ends and being rotated such that the bentportions are inserted into both ends of a bag with a product therein and grip the ends to straightly flatten the bag; and a pair of operation buttons applying a signal to operate the heating bar, the supporting bar, and the rotary cylinders.

Preferably, the pulling rollers can be rotated forward and backward, pull and convey a bag, which is supplied and conveyed from the roll mount of the bag feeding unit, to the opening and sealing unit while rotating forward, and when a product is put into a bag with an open top at the opening and sealing unit and then a top of the bag with the product therein is brought into close contact with the front plate of the frame by operation of the supporting bar of the sealing mean, the pulling rollers are rotated backward and a pre-dot-cut back of the bag is torn apart.

Preferably, a discharge conveyer receiving and conveying packs, which have been completed packingthrough sealing after a product is put into bags, to an appropriate place is further installed under the opening and sealing unit.

Embodiments

It should be noted that, in the specification, the term 'bag' means a packing paper manufactured from a packing film made of vinyl to package a product, and the term 'pack' means a single packaging bag that has been completed packing by sealing the top thereof with a product therein. Further, a half-cut bag is a bag formed in a pouch type with the back dot-cut with regular intervals and the front completely cut, and bags that are used in the packaging apparatus of the present disclosure are such haft-cut bags.

The packaging apparatus of the present disclosure is a semi-automatic packaging apparatus that automatically feeds bags manufactured in pouch types with the bottom sealed and the top half cut, opens the tops of the bags, and then packing the bags by sealing the tops after a worker puts a product into the bags, which are continuously conveyed and fed with the tops open in a connected state, and simultaneously separating and discharging the completed packs in single pieces.

Figure 1A:
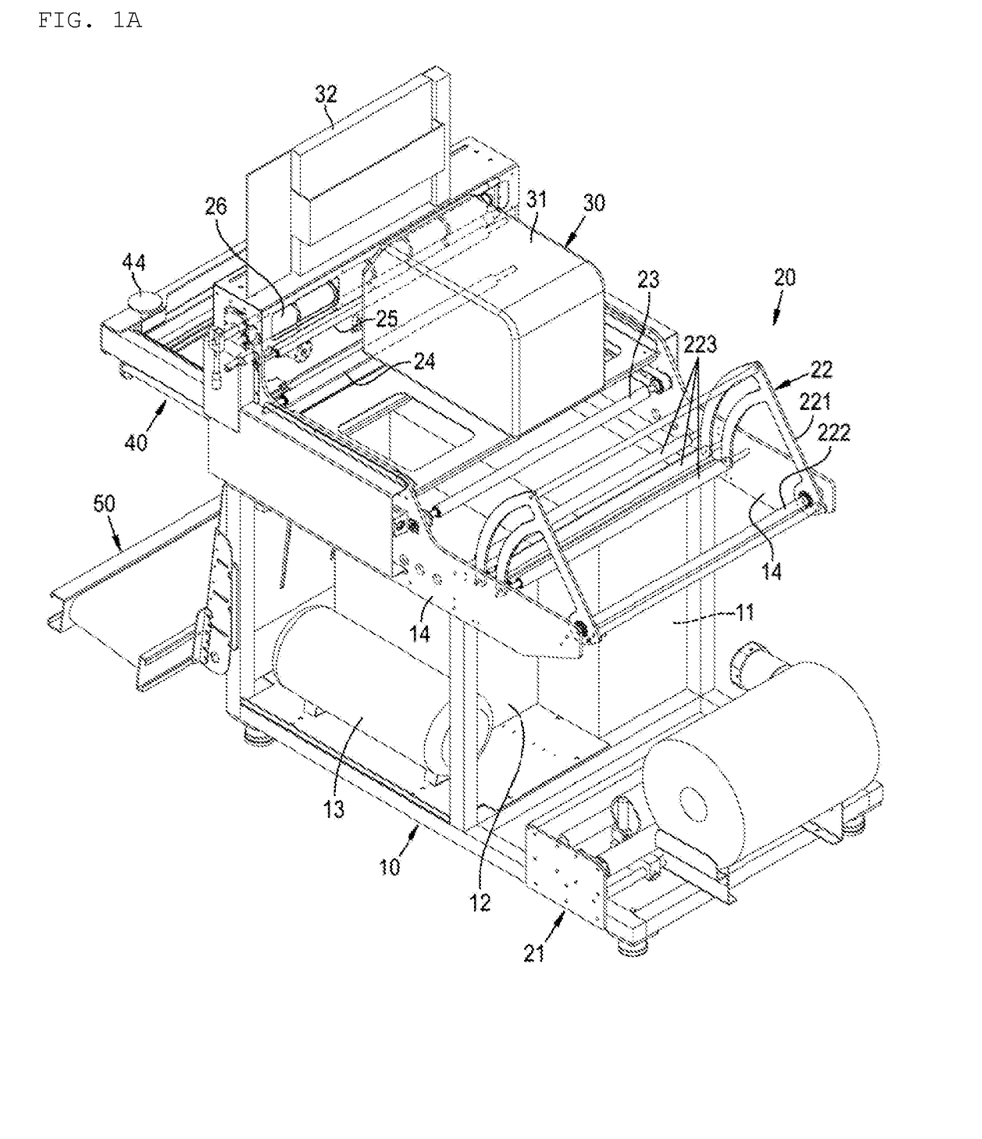
FIG. 1A is a side-rear perspective view of a packaging apparatus according to the present disclosure seen.
Figure 1B:
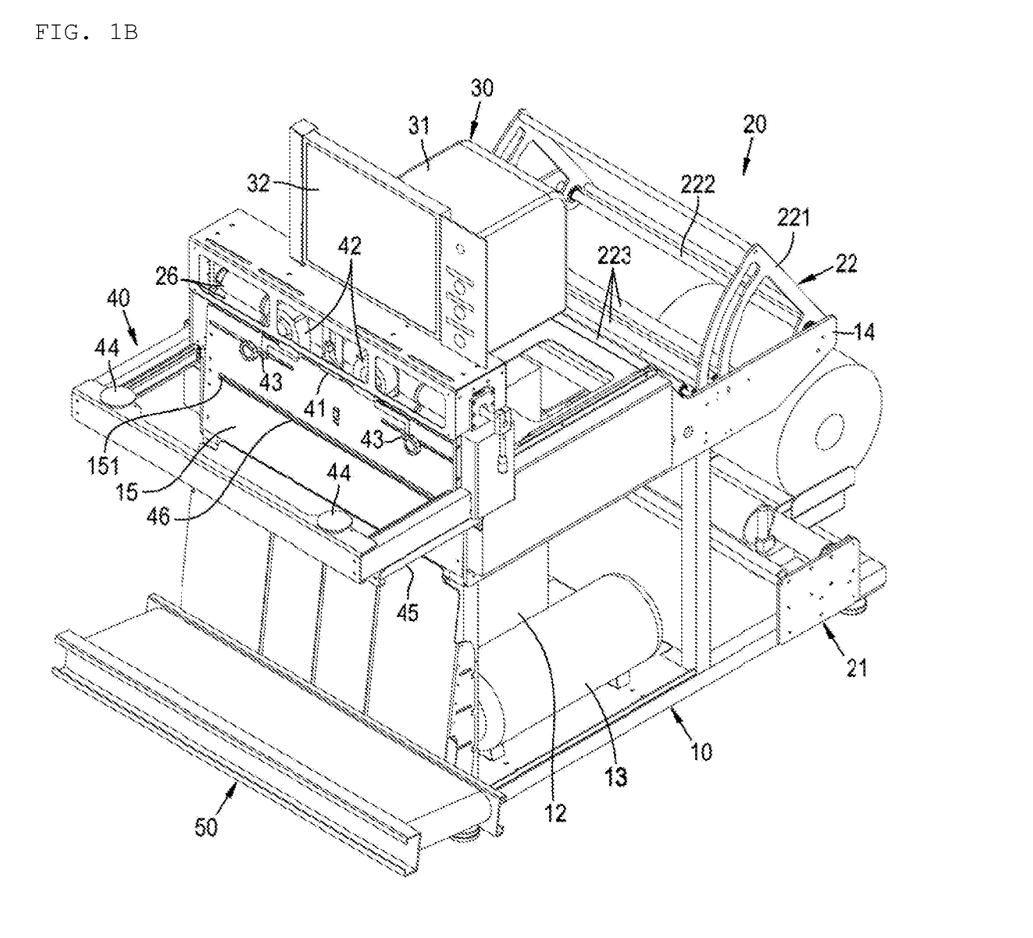
FIG. 1B is a side-front perspective view of a packaging apparatus according to the present disclosure.

The packaging apparatus of the present disclosure fundamentally includes: a frame 10 that is equipped with components for operating and controlling the apparatus therein, a bag feeding unit 20 that automatically conveys and feeds half-cut bags; a label attaching unit 30 that prints and attaches a label to bags that are conveyed thereto; and an opening and sealing unit 40 that opens the tops of bags, puts a product into the bags, and then seals the bags, in which a discharge conveyer 50 for receiving and conveying packs, which have been completed packing through sealing after a product is put into bags, to an appropriate place may be further installed under the opening and sealing unit 40 (see FIGS. 1A and 1B).

The frame 10 is equipped with components for operating and controlling the apparatus therein, that is, a PC 11 that controls the operation of the apparatus, an electric part box 12 that keeps various electric parts for operating the apparatus, a compressor 13 that supplies air for opening the tops of bags, etc. are installed. It is required to prevent a malfunction of the PC 11 due to noise, a magnetic field, etc., which are generated by operation of the compressor 13, in order to increase the reliability of the apparatus. Accordingly, the PC 11 and the compressor 13 need to be spaced apart from each other, so it is one of the features of the present disclosure that the electric part box 12 is disposed between the PC 11 and the compressor 13 (see FIG. 1A). The PC 11 not only controls operation of the apparatus, but is connected to a server and controls information that is put into a label such as product information or a delivery address.

The bag feeding 20, which is a component automatically conveying and feeding half-cut and wound bags, includes: a roll mount 21 on which a winding roll having half-cut bags wound thereon is mounted; a dancer roller 22 that conveys bags, which are fed and conveyed from the roll mount 21, toward the label attaching unit 30 while maintaining tension of the bags; first and second guide bars 23 and 24 that guide bags, which are conveyed from the dancer roller 22, and are disposed in front of and behind the label attaching unit 30, respectively (the 'behind' means the side where the bag feeding unit is positioned and the 'in front of' means the side where the opening and sealing unit is positioned); a third guide bar 25 that is installed vertically over the second guide bar 24 and guides conveyance of bags; and a pulling roller 26 that pulls bags that are conveyed from the third guide bar 25 (see FIG. 1A). The first to third guide bars 23, 24, and 25 function as idle rollers that guide bags, which are conveyed, while rotating by themselves.

Figure 2:
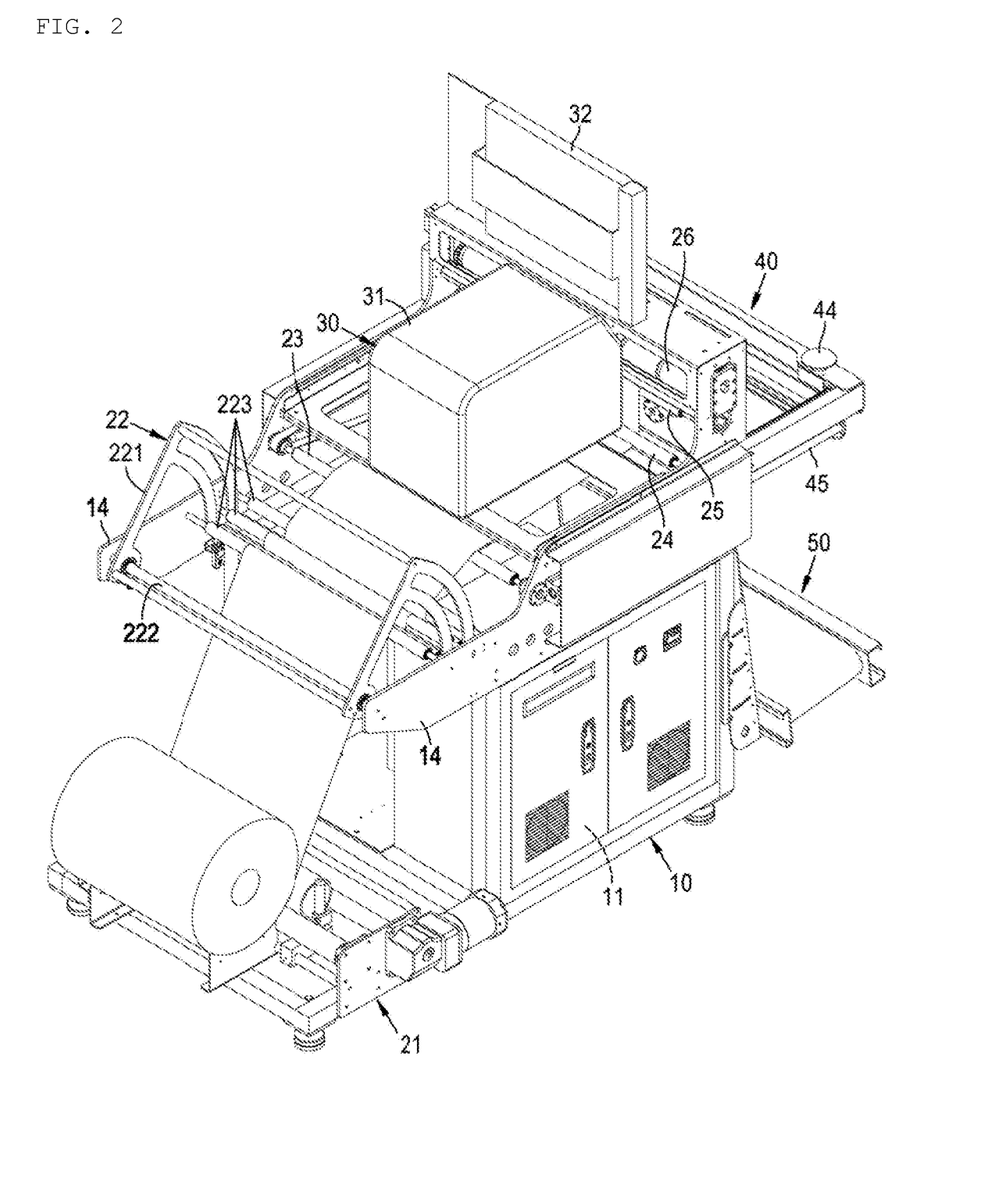
FIG. 2 is a view showing the state in which a bag is conveyed on the packaging apparatus.

To describe the conveyance process of a bag, when the winding roll seated on the roll mount 21 with a half-cut bag wound thereon is rotated, the wound bag is unwound and conveyed, tension is adjusted and maintained at a predetermined level while the bag conveyed from the roll mount 21 passes the dancer roller 22, and then the bag is horizontally conveyed to the second guide bar 24 while passing several bars of the dancer roller 22 and the first guide bar 23 and passing under a label printer 31, conveyed vertically to the third guide bar 25 from the second guide bar 24, horizontally conveyed to the pulling roller 26 from the third guide bar 25, and then conveyed to the opening and sealing unit 40 (see FIG. 2).

The pulling roller 22 is composed of a pair of rollers installed up and down and rotating in contact with each other and can be rotated forward and backward. The pulling roller 22 rotates forward to pull and convey a bag, which is fed and conveyed from the roll mount 21 of the bag feeding unit and inserted between the rollers disposed up and down, to the opening and sealing unit 40. A product is put into the bag with an open top at the opening and sealing unit 40, and then, when the supporting bar 45 of a sealing mean operates and brings the top of the bag with the product therein into close contact with a front plate 15 of the frame, the pulling roller 22 is rotated backward and the bag is separated into a single piece while the pre-dot-cut back thereof is torn apart.

The dancer roller 22 includes a pair of tension adjustment plates 221, a rotary bar 222, rotation guide bars 223, and tension adjustment bars 224. The tension adjustment plates 221 are provided in a pair, are each formed in a shape  shape) in which two coaxial circles are disposed to make an arc, a slot is formed between the circumferential surfaces of the two coaxial circles, and a radius portion at the lower portion of the arc is open, and are disposed respectively inside both side plates 14 of the frame (see FIG. 1A).

The rotary bar 222 is installed such that both ends are connected to the side plates 14 of the frame, respectively, through the centers of the arcs made by the tension adjustment plates 221, and enables rotation of the tension adjustment plates 221. Further, the rotation guide bars 223 are three bars of which both ends are connected to the inner sides of the side plates 14 of the frame, respectively, and the bars are installed to be positioned inside and outside the circumferential surfaces of the coaxial circles and in the slot formed between the two coaxial circles.

Figure 3A:
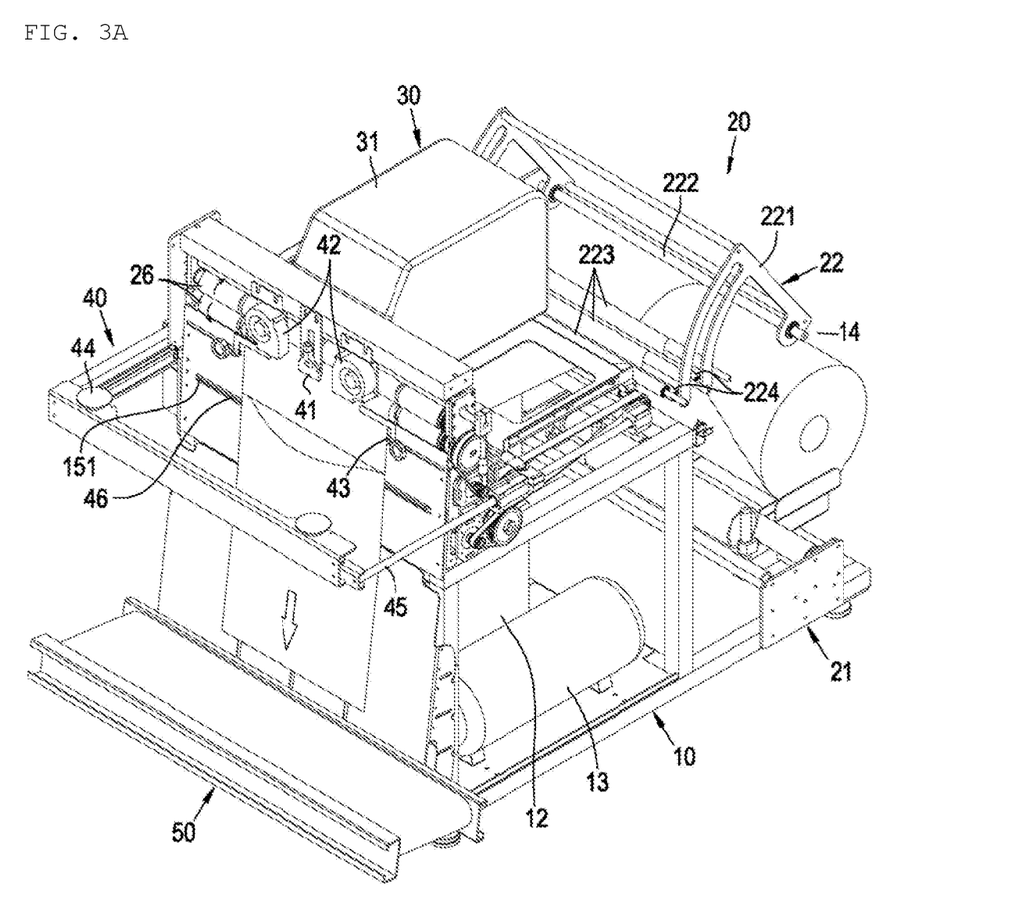
FIG. 3A is a view showing a bag automatically conveyed with the top open.

The tension adjustment bars 224 are two bars connected to the ends of the coaxial circles formed at the lower portions of the arcs and being open at the radius portions, thereby connecting the pair of tension adjustment plates 221. Of course, the number of the coaxial circles of the rotation guide bars 223, the tension adjustment bars 224, and the tension adjustment plates 221 may be appropriately adjusted (see FIG. 3A).

According to the dancer roller 22 configured in this way, when the tension adjustment plates 221 are rotated about the rotary bar 222, the tension adjustment bars 224 are rotated with the tension adjustment plates 221 and the positions of the tension adjustment bars 224 are adjusted, thereby maintaining tension of the bag held and conveyed on the rotation guide bars 223 and the tension adjustment bars 224. For example, when the pulling roller 26 is rotated backward, the bag conveyed from the bag feeding unit 20 cannot be conveyed to the opening and sealing unit 40, so tension of the bag conveyed from the bag feeding unit 20 decreases. Accordingly, the tension adjustment bars 224 move down and pull down the loosened bag while the tension adjustment plates 221 of the dancer roller 22 are rotated about the rotary bar 222, thereby maintaining the tension.

Further, when the pulling roller 26 is rotated forward, the bag conveyed from the bag feeding unit 20 is conveyed to the opening and sealing 40. If the pulling roller 26 is rotated backward and the tension of the bag is loosened, when the pulling roller forward, the tension adjustment plates 221 rotate about the rotary bar 222 and the tension adjustment bars 224 move the bag upward while moving upward, thereby maintaining the tension.

The label attaching unit 30 is a component that is installed on the top of the frame 10, and prints and attaches labels to bags, which are conveyed, through the label printer 31. By recognizing a barcode or a QR code having the information of a product and directly printing and attaching a label to a predetermined part on the outer surface of a bag, which is automatically conveyed, with the label printer 31 installed on the packaging apparatus, packaging is quickly and accurately performed without a separate process of attaching a label. Reference numeral '32' not described above indicates an operation monitor, and it is possible to display the operation states of the apparatus, etc. on the operation monitor and also possible to input operation of the apparatus because it is a touch screen. In addition, a barcode scanner, etc. may be provided.

The opening and sealing unit 40 is a component that forms a finished pack by opening the top of a bag so that a product can be put into the bag, and sealing the bag with the product therein while holding the bag such that the bag can be maintained in a straight shape. As for the manner of opening the top of a bag at the opening and sealing unit 40, first, the center portion of a bag is opened by compressed air supplied from the compressor, and immediately, air is blown by a blower and the bag is fully opened by the air, whereby an open shape is maintained.

The opening and sealing unit 40 includes a nozzle 41 that opens the top of a bag, a pair of blowers 42 that blows air to keep the bag open, and a sealing mean that seals the top of the bag after a product is put into the bag. The nozzle 41 is a component that opens the top of a bag, which is conveyed through the pulling rollers 26 of the bag feeding unit, by instantaneously blowing high-pressure compressed air supplied from the compressor 13 to the width-directional center portion of the bag. Only one nozzle is installed and air is not needed after the nozzle 41 instantaneously blows air, so the capacity of the compressor 13 can be small. Therefore, the compressor 13 can be installed inside the frame 10, and accordingly, the structure of the packaging apparatus itself can be made simple and compact.

The blowers 42 are components that are installed in a pair at both sides of the nozzle 41, respectively, and blow air into a bag with the center portion of the top open by the nozzle 41. The blowers 42 blows air to the open top of a bag by rotating fans using power rather than being supplied with compressed air from the compressor 13, thereby keeping the bag inflated so that a user can conveniently put a product into the bag (See FIG. 1).

The sealing mean is a component that seals the top of a bag after a product is put into the bag, which is open, through the top. The sealing mean includes a heating bar 46, a supporting bar 45, and a pair of rotary cylinders 43 (see FIG. 1B). The heating bar 46 is a component that is kept heated at a predetermined temperature for sealing. A slit 151 is formed in the left-right direction on the front plate 14 vertically installed on the front of the frame, and the heating bar 46 is installed to be positioned in the portion where the slit 151 is formed. Accordingly, when sealing, the heating bar 46 moves forward, heats a bag in contact with the supporting bar 45, and then moves backward. Since the heating bar 46 moves backward after sealing, as described above, even though the heating bar 46 is kept heated at a predetermined temperature and there is a bag in front of the front plate 15 of the frame, the bag is not heated and thus is not crumpled.

Since the heating bar 45 is kept heated at a predetermined temperature for sealing, it takes short time to raise the temperature up to a sealing temperature, as compared with the manner of applying heat only in sealing by instantaneously applying heat, so it is possible to remarkably reduce the time in sealing.

The supporting bar 45 is formed in a U-shape, is installed in front of the heating bar 46, is operated while moving forward and backward, and presses the top of a bag with a product into close contact with the portion right over the slit 151 formed in the front plate 15 of the frame. It is preferable to attach a heat-resistance sponge to the surface of the supporting bar 45 so that even though the heating bar 46 is heated, the heat does not transfer to the supporting bar 45 and the operation of bringing a bag into close contact with the front plate 15 of the frame can be smoothly performed.

The rotary cylinders 43 are installed in a pair on the front plate 15 of the frame and include grippers formed in an L-shape at front ends. When the rotary cylinders 43 rotate the gripper 90°, the bent portions of the gripper are inserted into both ends of a bag with a product therein and grip both sides such that the bag is straightly flattened, and sealing is performed on the bag flattened straightly with both sides gripped. Accordingly, the bag is neatly sealed without the sealing portion crumpled in a straightly flattened state.

Figure 3B:
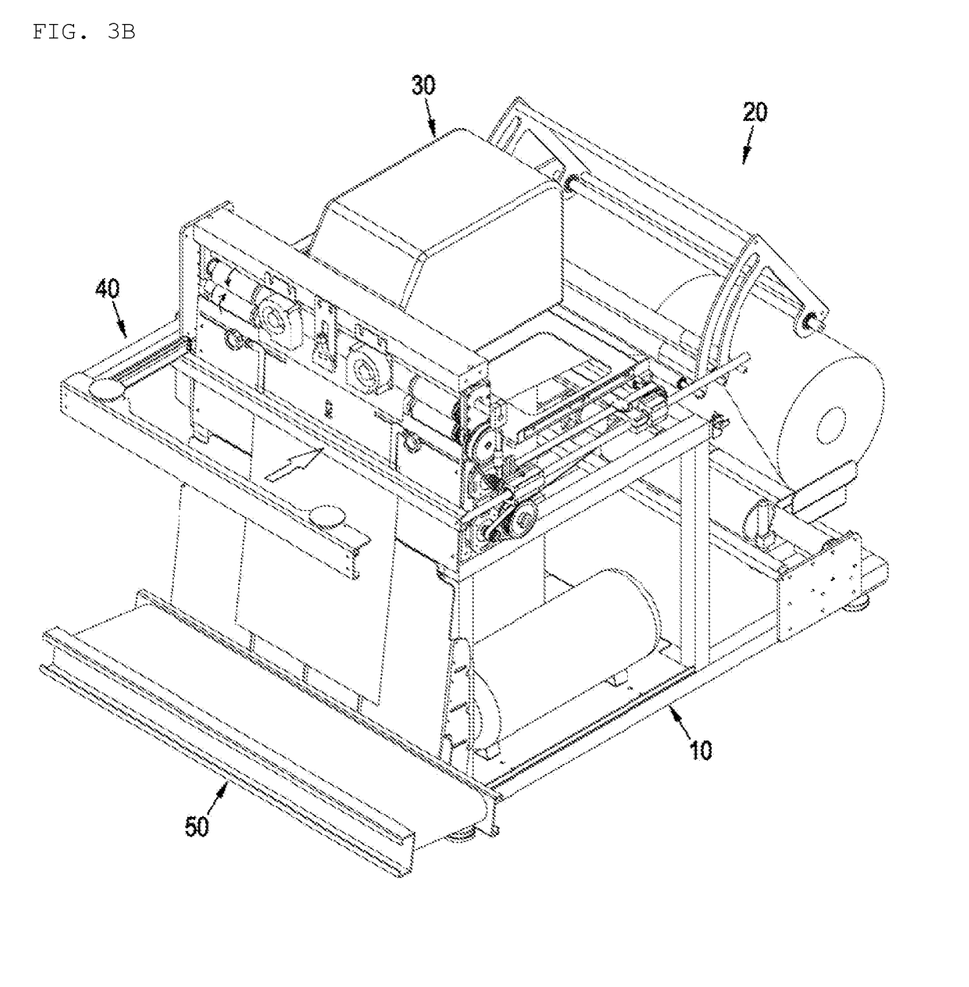
FIG. 3B is a view showing the state in which a supporting bar is moved toward a heating bar to seal an open top of a bag.
Figure 3C:
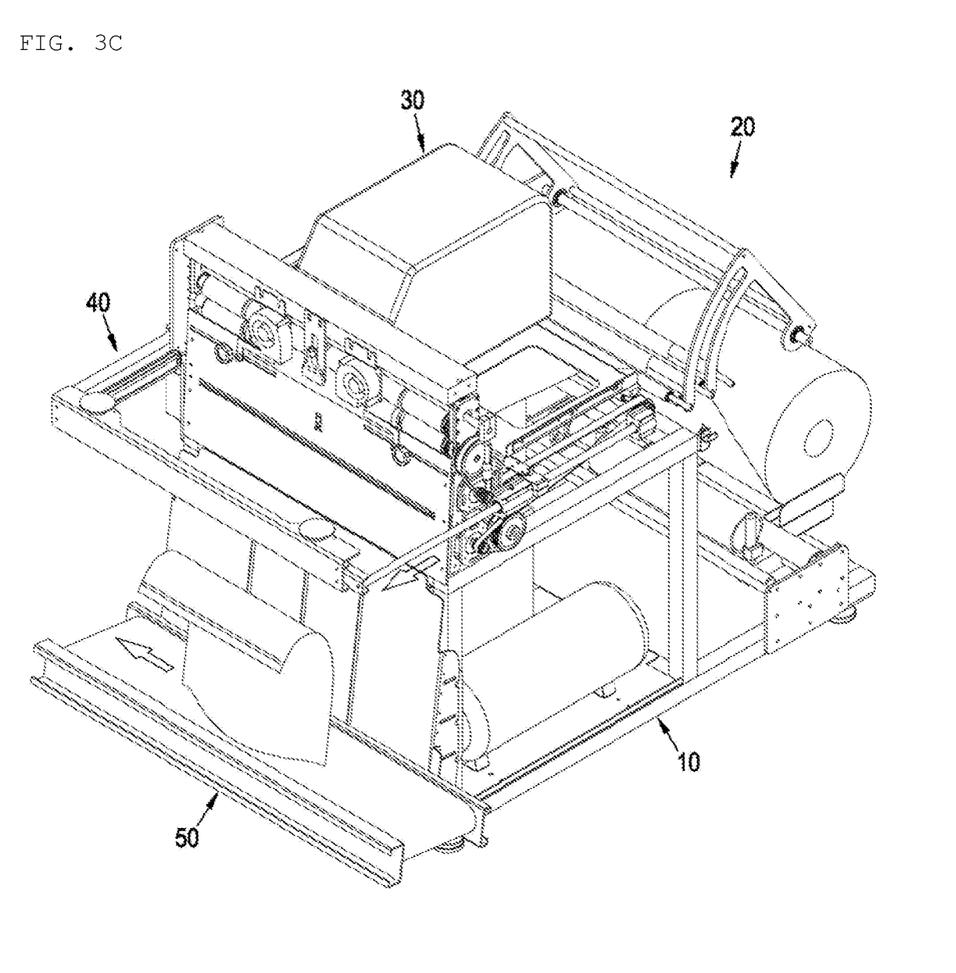
FIG. 3C is a view showing the state in which the supporting bar is moved away from the heating bar to the initial position after by sealing the top of a bag and completing the packing.

An operation button 44 is a button for applying a signal to operate the heating bar 46, the supporting bar 45, and the rotary cylinders 43. A pair of operation buttons 44 is installed on the U-shaped rod installed to protrude in front of the front plate 15 of the frame. When a worker presses the pair of operation buttons 44 with both hands after putting a product into a bag, the heating bar 46, the supporting bar 45, and the rotary cylinders 43 start to operate (see FIGS. 3A to 3C).

To briefly describe the operation of the opening and sealing unit 40, after the top of a bag is opened by high-pressure air supplied from the compressor 13 and then sprayed through the nozzle 41, the pair of blowers 42 keeps the bag open by blowing air into the open bag, a product is put into the bag, and then, when a worker presses the operation buttons 44, the heating bar 46 moves forward, the supporting bar 45 also moves toward the heating bar 46 and brings the top of the bag into close contact with the portion right over the portion where the slit 151 is formed in the front plate 15 of the frame, and the grippers of the pair of rotary cylinders 43 are inserted into both ends of the opening of the bag and grip both sides of the bag, whereby the bag is maintained in a straightly flattened state. In this process, the pulling rollers 26 are rotated backward and the dot-cut back of the bag is torn apart, whereby the bag is separated into a single piece from a bag that is continuously conveyed and the separated bag is sealed by heat of the heating bar 46. These sequential operations are almost simultaneously performed (see FIGS. 3A to 3C).

The above description is provided as an example of the present disclosure, and the embodiments described herein are provided to describe the present disclosure rather than limiting the spirit of the present disclosure, so the present disclosure may be changed and modified in various ways by those skilled in the art without departing from the scope of the present disclosure. Therefore, the protective range of the present disclosure should be construed by those described in claims, and technical configuration in the equivalent range should also be construed as being included in the scope of the present disclosure.

INDUSTRIAL APPLICABILITY

The packaging apparatus for packaging bags is an apparatus that opens the top of a bag manufactured in a pouch type with a half-cut top, puts a product into the bag, and then seals, packs, and automatically discharges the bag, has a simple and compact structure and has a remarkably high packaging speed in comparison to packaging apparatuses of the related art, so the packaging apparatus can be very usefully used for work of packaging a product in a pouch-type bag.

REFERENCE SIGNS LIST

10: Frame
11: PC
12: Electric part box
13: Compressor
14: Side plate
15: Front plate
151: Slit
20: Bag feeding unit
21: Roll mount
22: Dancer roller
221: Tension adjustment plate
222: Rotary bar
223: Rotation guide bar
224: Tension adjustment bar
23: First guide bar
24: Second guide bar
25: Third guide bar
26: Pulling roller
30: Label attaching unit
31: Label printer
32: Operation monitor
40: Opening and sealing unit
41: Nozzle
42: Blower
43: Rotary cylinder
44: Operation button
45: Supporting bar
46: Heating bar
50: Discharge conveyer

The invention claimed is:

1. A packaging apparatus for packaging bags equipped with a label printer that automatically feeds bags manufactured in a pouch type with a half-cut top, opens tops of the bags, puts a product into the bags, packs the bags through sealing, and then discharges the bags, the packaging apparatus comprising:

a frame equipped with components for operating and controlling the apparatus therein;

a bag feeding unit automatically conveying and feeding half-cut and wound bags;

a label attaching unit installed on the frame and printing and attaching a label to the bags that are conveyed; and an opening and sealing unit opening tops of the bags, putting a product into the bags, and then packing the bags through sealing, wherein a PC controlling operation of the apparatus, an electric part box keeping various electric parts for operating the apparatus, a compressor supplying air for opening tops of bags are installed inside the frame, and the PC and the compressor are spaced apart from each other such that the electric part box is disposed between the PC and the compressor, wherein the opening and sealing unit includes:

a nozzle opening a top of a bag that is conveyed by instantaneously blowing air, which is supplied from the compressor, to a width-directional center portion of the bag;

a pair of blowers installed at both sides of the nozzle, respectively, and keeping the bag with the top open by the nozzle inflated by blowing air to the top of the bag by rotating fans; and a sealing mean sealing the top of the bag after a product is put into the bag through the open top, wherein the sealing mean includes:

a heating bar installed to be positioned in a portion where a slit, which is formed in a left-right direction on a front plate vertically installed on a front of the frame, is formed, and kept heated at a predetermined temperature for sealing;

a supporting bar formed in a U-shape, installed in front of the heating bar, operated to move forward and backward, and pressing a top of a bag with a product therein into close contact with a portion right over the slit formed in the front plate of the frame;

a pair of rotary cylinders installed on the front plate of the frame and having grippers bent in an L-shape at front ends and being rotated such that the bending portions are inserted into both ends of a bag with a product therein and grip the ends to straightly flatten the bag; and a pair of operation buttons applying a signal to operate the heating bar, the supporting bar, and the rotary cylinders, and wherein a heat-resistant sponge is attached to a surface of the supporting bar to prevent from transferring to the supporting bar even though the heating bar is heated.

2. The packaging apparatus of claim 1, wherein the bag feeding unit includes:

a roll mount on which a winding roll having half-cut bags wound thereon is mounted;

a dancer roller conveying bags, which are supplied and conveyed from the roll mount, to the label attaching unit while maintaining tension of the bags;

first and second guide bars guiding bags that are conveyed from the dancer roller and positioned behind and in front of the label attaching unit, respectively;

a third guide bar installed vertically over the second guide bar and guiding conveyance of bags; and pulling rollers pulling bags that are conveyed from the third guide bar.

3. The packaging apparatus of claim 2, wherein the dancer roller includes:

a pair of tension adjustment plates each formed in a shape in which two coaxial circles are disposed to make an arc, a slot is formed between circumferential surfaces of the two coaxial circles, and a radius portion at a lower portion of the arc is open, and disposed respectively inside both side plates of the frame;

a rotary bar installed such that both ends are connected to the side plates of the frame, respectively, through centers of the arcs made by the tension adjustment plates, and enabling rotation of the tension adjustment plates;

rotation guide bars being three bars of which both ends are connected to inner sides of the side plates of the frame, respectively, and installed to be positioned inside and outside the circumferential surfaces of the coaxial circles and in the slot formed between the two coaxial circles; and tension adjustment bars being two bars connected to ends of the coaxial circles formed at lower portions of the arcs and being open at the radius portions, and connecting the pair of tension adjustment plates, wherein when the tension adjustment plates are rotated about the rotary bar, the tension adjustment bars maintain tension of a bag that is conveyed while rotating with the tension adjustment plates.

4. The packaging apparatus of claim 2, wherein the pulling rollers can be rotated forward and backward, pull and convey a bag, which is supplied and conveyed from the roll mount of the bag feeding unit, to the opening and sealing unit while rotating forward, and when a product is put into a bag with an open top at the opening and sealing unit and then a top of the bag with the product therein is brought into close contact with the front plate of the frame by operation of the supporting bar of the sealing mean, the pulling rollers are rotated backward and a pre-dot-cut back of the bag is torn apart.

5. The packaging apparatus of claim 1, wherein a discharge conveyer receiving and conveying packs, which is completed packing through sealing after a product is put into bags, to an appropriate place is further installed under the opening and sealing unit.

\* \* \* \* \*